J. W. MacDONALD.
MEASURING DEVICE FOR SKIRTS OF DRESSES.
APPLICATION FILED MAY 22, 1908.

967,800.  Patented Aug. 16, 1910.

UNITED STATES PATENT OFFICE.

JOHN W. MacDONALD, OF PITTSBURG, PENNSYLVANIA.

MEASURING DEVICE FOR SKIRTS OF DRESSES.

967,800.  Specification of Letters Patent.  Patented Aug. 16, 1910.

Application filed May 22, 1908. Serial No. 434,393.

*To all whom it may concern:*

Be it known that I, JOHN W. MACDONALD, a citizen of the United States, residing at Pittsburg, in the county of Allegheny and State of Pennsylvania, have invented an Improvement in Measuring Devices Such as are Used by Dressmakers in Fitting the Skirts of Dresses, which improvement consists of a laterally-movable gage-ring designed to be raised and lowered about a circular platform by a lateral movement of said gage-ring, and is fully described in the following specification and the drawings attached, in which—

Figure 1:
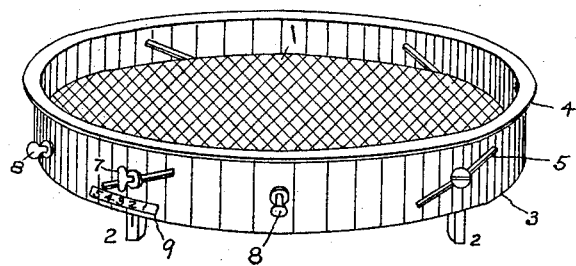
Figure 2:
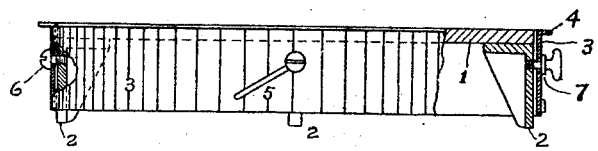

Figure 1, is a perspective view of the completed device; Fig. 2, is a view of the same, partly in elevation and partly in section.

In constructing said improvement a circular platform 1 is formed of suitable size and material, to which legs 2 are attached in such manner that the outside lines thereof will be at right angles to the plane of the surface of said platform. A gage ring 3 of such size as to slide neatly down over said platform 1 and legs 2 is formed from sheet metal, and provided with a flange 4 and a series of slotted openings 5 cut therein at an acute angle to the edges of said gage ring 3 and at such points around the said gage ring as that said openings will correspond with the position of the legs 2 on said platform, for the purpose hereinafter set forth.

The gage ring 3 with the flange 4 uppermost is placed over the platform 1 and allowed to drop down until said flange is on a line with the upper surface of said platform, and is moved to such position as that each of the slotted openings 5 therein will be opposite one of the legs 2. Through each of said slotted openings 5 in the gage ring 3 and into a previously tapped hole in the platform legs 2, a threaded pin 6, having a machined head, is inserted, which pin is of slightly less diameter than the width of the slotted opening 5, and when in place said pins act to support the gage ring 3; one of said pins is provided with a shoulder 7 worked to such shape as to permit of hand adjustment thereof. Attached to the outer surface of the gage ring 3 are knobs 8 and a figured gage 9 the latter being so located with respect to one of the legs 2 as that the said leg will act as an indicator.

When at rest, the upper or flanged part of the ring 3 will be on a level with the upper surface of the platform 1, and it will be seen that if the knobs 8 be grasped and said gage ring be moved in the direction of the inclination of the slotted openings 5 it will ride upon the pins 6 and must ascend along the line of the angle formed by said slotted openings, and when the desired height is reached its position may be fixed by turning the screw having the shoulder 7 until the gage ring 3 presses against the leg 2.

In operation the model steps upon the platform 1 and allows the garment to be marked to fall over and about the flange of the gage ring 3; said gage ring is then adjusted to the desired height in the manner above described and the garment marked by following the line of the flange 4 on the said gage ring 3.

What I desire to secure by Letters Patent is:—

1. A skirt measuring device comprising a platform, an annular gage-ring surrounding the same, and provided with a flange about its upper edge, and means adjustably engaging said ring with the platform, whereby said ring is caused to be raised or lowered by a partial circumferential movement thereof, said means comprising radially disposed members carried by said platform extending through angularly disposed openings formed within the gage.

2. A skirt measuring device comprising a platform, an annular gage-ring surrounding the same, and means adjustably engaging said ring with the platform, whereby said ring is caused to be raised or lowered by a partial circumferential movement thereof in respect to the plane of said platform, said means comprising radially disposed members carried by said platform extending through angularly disposed openings formed within the gage.

3. A skirt measuring device comprising a platform, an annular gage-ring surrounding the same, means adjustably engaging said ring with the platform, whereby said ring is caused to be raised or lowered by a partial circumferential movement thereof, said means comprising radially disposed members carried by the platform extending through angularly disposed openings formed within the gage, means for securing the ring at any desired position within the limits of its adjustment, and means for determining the elevation of said ring above the platform.

4. In a skirt measuring device having a circular platform, a laterally movable sheet metal gage-ring provided with a series of slotted openings cut therein at an acute angle to the edges thereof, encircling said platform, and screw pins on said platform for supporting said movable gage-ring by means of said openings, for the purpose described.

JOHN W. MacDONALD.

Witnesses:
   J. B. DUFFORD,
   J. T. WADDELL.